No. 750,625. PATENTED JAN. 26, 1904.
J. A. R. ELLIOTT.
EAR DRUM PROTECTOR.
APPLICATION FILED AUG. 18, 1903.
NO MODEL.

No. 750,625. Patented January 26, 1904.

UNITED STATES PATENT OFFICE.

JAMES A. R. ELLIOTT, OF KANSAS CITY, MISSOURI.

EAR-DRUM PROTECTOR.

SPECIFICATION forming part of Letters Patent No. 750,625, dated January 26, 1904.

Application filed August 18, 1903. Serial No. 169,948. (No model.)

*To all whom it may concern:*

Be it known that I, JAMES A. R. ELLIOTT, a citizen of the United States, residing at No. 807 Delaware street, Kansas City, in the State of Missouri, have invented certain new and useful Improvements in Ear-Drum Protectors, of which the following is a specification.

My invention relates to improvements in ear-drum protectors.

The object of my invention is to protect the drum of the ear from excessive air waves or pressure due to the concussion caused by the discharge of firearms or other causes and yet permit sound-waves to reach the ear-drum.

With this object in view my invention consists in the novel construction, arrangement, and combination of the several parts, as will hereinafter be described and afterward pointed out in the specification and claims.

Figure 1:
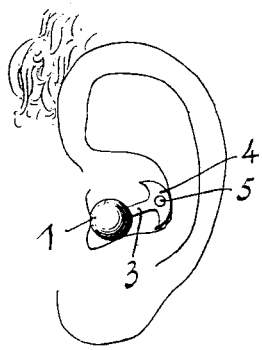
Figure 2:
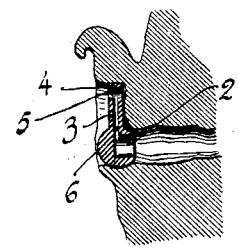
Figure 3:
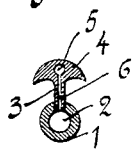

Figure 1 is a perspective view of my apparatus inserted in an ear. Fig. 2 is a sectional view of my apparatus in an ear. Fig. 3 is a perspective view of a modification of my apparatus.

Similar numerals of reference refer to similar parts throughout the several views.

My ear-drum consists of a ball or body portion 1, which is adapted to fit into and fill the ear hole or aperture and is provided with a recess 2 and a stem 3, terminating in the head 4 at the outer end thereof. Through the head 4 is cut the opening 5, and through the stem 3 is cut the small passage-way 6, communicating with the opening 5 and the recess 2. When my protector is in use, the ball 1 is inserted in the ear-aperture and the head 4 is fitted into the fold of the outer ear, so that the apparatus is held firmly in position, and sound-waves are permitted to pass into the ear-aperture through the opening 5, the small passage-way 6, and recess 2, while at the same time the ear-drum is protected from any violent shock due to excessive atmospheric waves or pressure caused by the discharge of firearms, concussion, or excessive sound-waves. The small passage-way 6 not only permits sound-waves to enter the ear-aperture, but permits the escape of air, and thereby provides a means for ventilation and the escape of animal heat from the ear.

In Fig. 3 I have shown a modification of my apparatus in which the stem 3 is fitted into the ball or body portion by a screw-thread. By means of this modification the stem may be screwed into the ball or body portion to a greater or less distance, thereby rendering the length of the stem adjustable, so that my appliance may be adjusted to fit accurately into the fold of the ear.

Having thus described my invention, what I claim as new, and desire to secure by Letters Patent, is—

1. An ear-protector adapted to fill the ear-aperture, having a recess opening into the ear-aperture and a stem provided with a passage-way communicating with such recess.

2. In an ear-protector the combination between a body portion having a recess therein and a stem provided with a passage-way therethrough, such stem being adjustably attached to the body portion by means of a screw-thread substantially as and for the purposes set forth.

3. An ear-drum protector consisting of a body portion, adapted to fit into the ear-aperture and provided with a recess opening in the ear-aperture and a stem provided with a passage-way communicating with said recess, such stem having a head adapted to fit into the fold of the outer ear and hold the protector in position in the ear.

4. An ear-drum protector consisting of a body portion adapted to fill the ear-aperture, having a small opening therethrough adapted to communicate with the ear-passage and with the outer air and a hollow stem adapted to fit into the fold of the outer ear and hold the protector in position in the ear.

5. An ear-drum protector consisting of a body portion adapted to fill the ear-aperture and a hollow stem, the passage-way through said stem being adapted to communicate with the ear-passage and with the outer air substantially as and for the purposes set forth.

Signed at the city of New York, county and State of New York, this 3d day of August, A. D. 1903.

JAMES A. R. ELLIOTT.

Witnesses:
I. R. SWEZEY, Jr.,
E. QUINN.